Jan. 12, 1960 P. T. FARNSWORTH 2,921,228

COLOR TELEVISION APPARATUS

Filed May 18, 1954 8 Sheets-Sheet 1

INVENTOR.
PHILO T. FARNSWORTH

BY George R. Gust
ATTORNEY

INVENTOR.
PHILO T. FARNSWORTH
BY
George R. Gust
ATTORNEY

INVENTOR.
PHILO T. FARNSWORTH
BY
George R. Gust
ATTORNEY

Jan. 12, 1960 P. T. FARNSWORTH 2,921,228

COLOR TELEVISION APPARATUS

Filed May 18, 1954 8 Sheets-Sheet 4

INVENTOR.
PHILO T. FARNSWORTH

BY George A. Gust
ATTORNEY

INVENTOR.
PHILO T. FARNSWORTH
BY George R. Gust
ATTORNEY

Jan. 12, 1960 P. T. FARNSWORTH 2,921,228
COLOR TELEVISION APPARATUS
Filed May 18, 1954 8 Sheets-Sheet 6

INVENTOR.
PHILO T. FARNSWORTH
BY
George R. Gust
ATTORNEY

Jan. 12, 1960 P. T. FARNSWORTH 2,921,228

COLOR TELEVISION APPARATUS

Filed May 18, 1954 8 Sheets-Sheet 7

INVENTOR.
PHILO T. FARNSWORTH
BY
George R. Gust
ATTORNEY

INVENTOR.
PHILO T. FARNSWORTH
BY
George A. Gust
ATTORNEY

United States Patent Office 2,921,228

Patented Jan. 12, 1960

2,921,228

COLOR TELEVISION APPARATUS

Philo T. Farnsworth, Fort Wayne, Ind., assignor to International Telephone and Telegraph Corporation Application May 18, 1954, Serial No. 430,648

9 Claims. (Cl. 315—13)

The present invention relates to color television apparatus and more particularly to a color television display device for reproducing pictures in substantially natural color.

At the present time, the Federal Communications Commission has officially adopted certain standards to the transmission of television signals which may be reproduced in substantially natural color. This adopted system has been characterized by the art as being a "simultaneous system" for the reason that color information is transmitted simultaneously with the usual monochrome video and audio signals. Color television receivers are being produced and sold to the public in some quantity, and such receivers have tended to follow certain designs which may be characterized as conventional. The system for transmitting and reproducing these conventional color television signals has been widely publicized and appear in such descriptive technical articles as the January 1954 edition of the Proceedings of the I.R.E.

A type of conventional receiver presently in production utilizes a single display tube having a viewing screen comprised of differently colored, phosphor dots which are arranged in exact registry with a perforated mask spaced therefrom and also having three individual electron guns which represent three different colors, for example, red, green and blue. This particular picture tube has proven to be extremely costly to manufacture and operatively deficient in a number of respects known to persons skilled in the art.

Another type of picture tube is suggested in the U.S. Patent No. 2,370,863 to Leverenz, in which the viewing screen consists of parallel phosphor strips extending horizontally across the screen surface. The strips are composed of phosphor material, which luminesce in red, green and blue colors respectively, and are arranged in orderly sequence with green and blue strips following each red strip. A cathode ray beam scans the screen and produces luminescence of a color corresponding to the color of the video signals utilized to modulate the beam.

Among the various problems experienced in the use of tubes of this Leverenz type is that of providing complete control of the electron beam such that there is accurate registry of the beam with the correct phosphor color area of the screen. This problem of obtaining accurate registry is present regardless of whether the strips extend in other than the aforementioned horizontal direction and constitutes serious limitations upon the use of phosphor strips for reproducing pictures.

In view of the general discussion of the foregoing, it is an object of this invention to provide a simplified means for reproducing television pictures in substantially natural color.

It is another object of this invention to provide a color television picture tube which can be used with the conventional television standards as adopted by the F.C.C.

to provide a relatively large television picture in substantially natural color.

It is yet another object of this invention to provide a color television picture tube in which the aforementioned problem of registration is obviated thereby simplifying the design of equipment for reproducing color television signals.

It is another object of this inventon to provide a color television picture tube which requires only a single electron gun needing no particular registration with the viewing screen as is true in the aforementioned tube having the three electron guns accurately registered with the perforated mask.

In accordance with the present invention, there is provided an electron discharge device comprising an electron gun from which issues a controllable electron beam for scanning over a target electrode having a plurality of beam-receiving apertures. Mounted on the side of the target electrode opposite the gun is an electron mirror electrode which is capable of repelling the beam emitted by the electron gun along a reflex path, the beam first passing through an aperture of the target electrode and thereafter being returned to the target by the mirror electrode. The target is coated with phosphor material on the side adjacent the mirror in parallel strips of the character mentioned in the foregoing, which strips are arranged in an orderly manner in alignment with the target apertures. Electron optical means are disposed in controlling relationship with the beam such that the beam will be normally directed perpendicularly to the surface of the mirror electrode over substantially the entire field of scansion which is produced by the usual beam-scanning means. Color-controlling means are also disposed to determine the path of said beam and for altering the direction of said path from the aforementioned perpendicular one to one angularly offset. Being angularly offset, the path of the beam as it is repelled by the electron mirror will strike a phosphor strip disposed to one side of the aperture through which the beam initially passed. By controlling the angle of the beam as it passes through a selected target aperture, the beam may be caused to impinge a particular area of the aforementioned phosphor strips lying adjacent the aperture. Varying the angularity of the beam as it passes through the aperture may thereby be utilized as an expedient for controlling beam impingement on a particular elemental phosphor area and to therefore produce a selected color spot. The particular light emissive area impinged by the beam at any given instant is determined in part by the angularity of the beam as it passes through the aperture and also by the cross-sectional size of the beam. The exact manner in which the beam is controlled and the color image is reproduced will be explained in more detail in the following.

For a better understanding of the invention, together with other and further objects thereof, reference is made to the following description, taken in connection with the accompanying drawing, its scope being defined by the appended claims.

Figure 13:
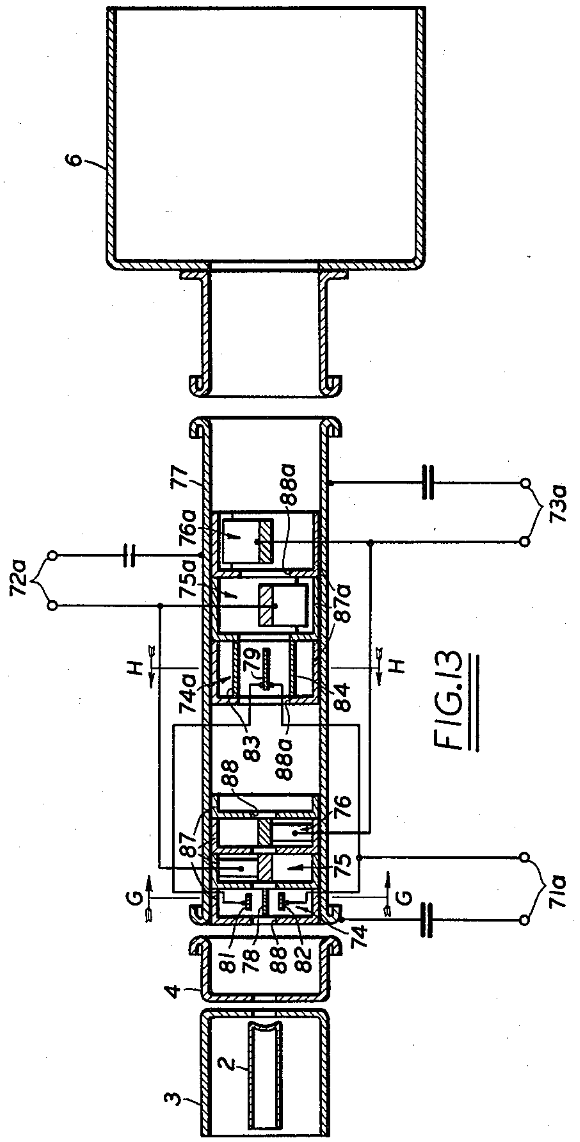
Fig. 13 is a sectional view similar to Fig. 2 illustrating another embodiment of this invention.
Figure 14:
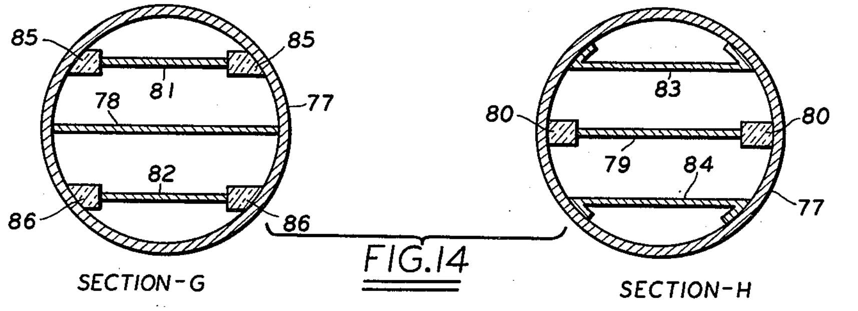

Fig. 14 provides sectional views of Fig. 13; and

Figure 15:
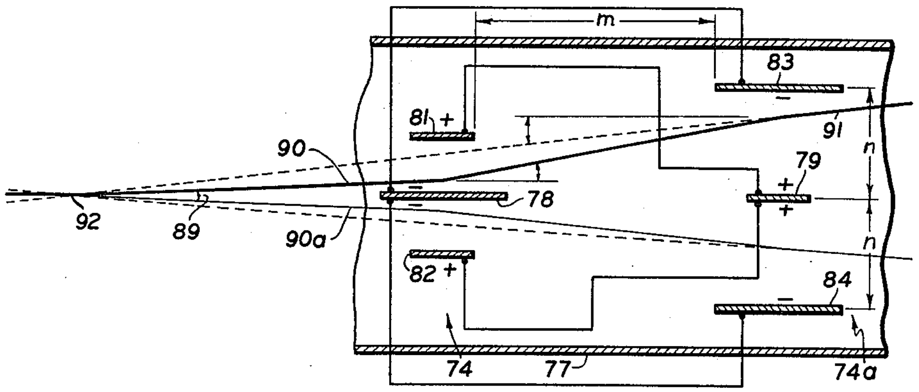

Fig. 15 is a diagrammatic illustration used in explaining the operation of the embodiment of Fig. 13.

Figure 1:
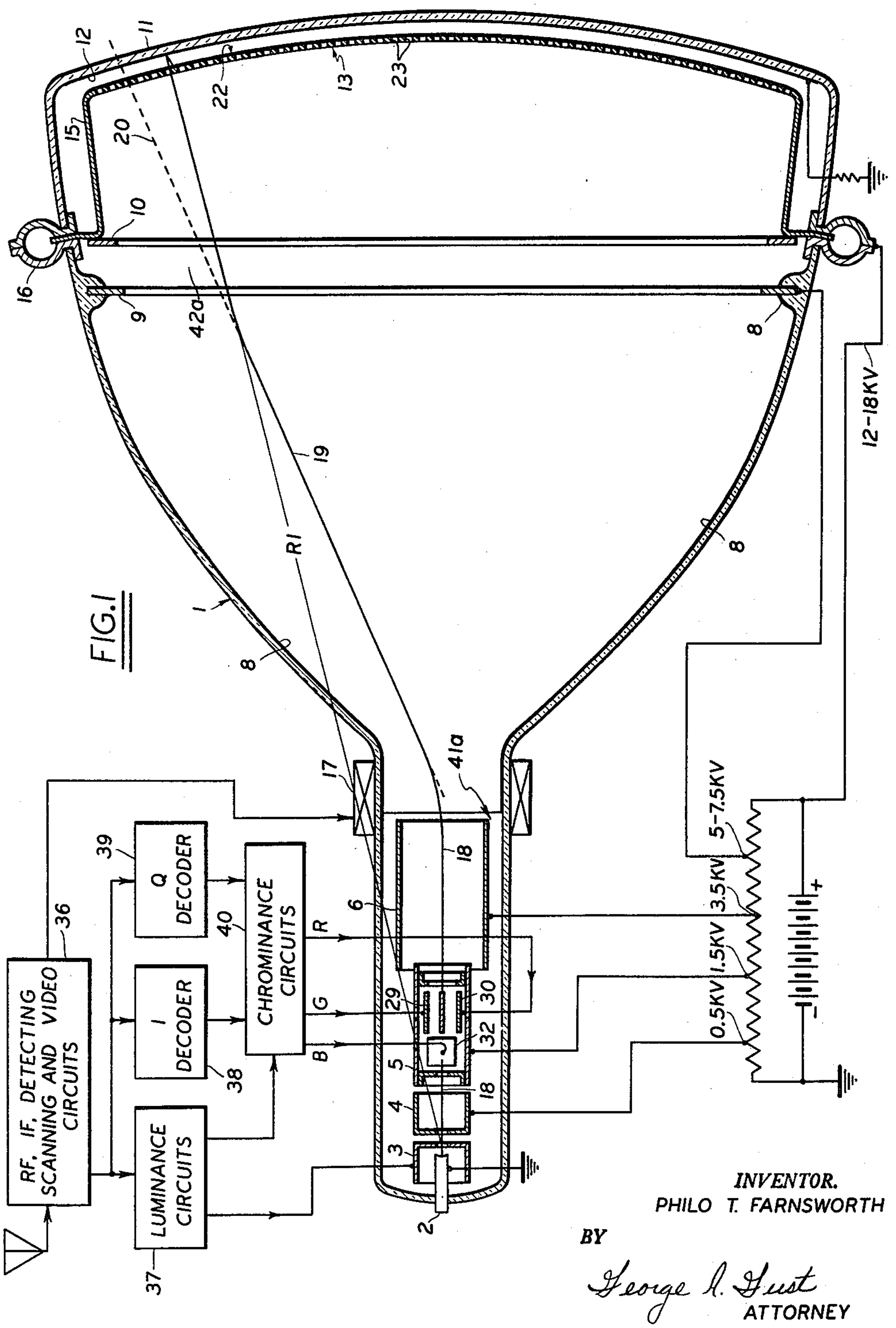
Fig. 1 is a longitudinal horizontal sectional view of one embodiment of this invention as coupled into a conventional receiver shown in block diagram.

With reference to the drawings, and more particularly to Fig. 1, conventional color television receiver circuitry is indicated in block diagram form as operatively coupled to a cathode ray picture tube generally indicated by the reference numeral 1. Mounted within the neck portion of the envelope is an electron gun structure for producing an electron beam along a predetermined path. This electron gun structure is diagrammatically illustrated and comprises essentially an electron emissive cathode 2 which is partially surrounded by a coaxially apertured grid electrode 3. Axially spaced from and coaxial with the control grid 3 are second and third tubular anode electrodes 4 and 5, respectively, which are provided with coaxial beam-masking apertures as shown. Another diametrally larger tubular anode 6 coaxially extends forwardly from the anode 5. A conductive coating 8 is applied to the inner surface of the tube envelope as shown to extend forwardly from anode 6.

In the front end of the envelope are mounted two annular or ovular conductive rings 9 and 10 which are spaced apart axially a distance which will be explained more fully hereafter. The conductive coating 8 is conductively extended onto the ring 9, but the ring 10 is insulated therefrom. The forward end of the tube is provided with a transparent face plate 11 of spherical cross-section which carries on the interior surface a transparent conductive film 12 of stannous chloride (Nesa) or any other transparent conductive material known in the art. Mounted to the rear of the face plate 11 and in substantial parallelism therewith is a conductive target electrode 13 which is provided with a plurality of spaced apertures 23. The outer perimeter of this electrode 13 is formed into a tubular flange 15 which is bent radially outwardly to be clamped in a suitable annular terminal assembly 16 as shown. The ring 10 is conductively secured to and supported by this tubular flange 15.

In Fig. 1, the radius of curvature of the cylindrical face plate 11 is indicated by the radius symbol "$R_1$," and the center of curvature has been assumed to lie close to the cathode 2. Other values of $R_1$ may be chosen, but it is important that the tube be designed so that (in the absence of color signals, see below) the electron beam extends perpendicularly toward the face plate.

The target electrode 13 is formed and positioned in substantially exact parallelism with the face plate 11. The importance of the relationship of the target electrode with the face plate 11 will be explained more fully hereinafter.

The usual horizontal and vertical scanning or deflection coils are supported about the neck of the tube envelope, as indicated by the reference numeral 17. The function of the scanning coil 17 is the same as in the usual instance and serves to scan the electron beam both horizontally and vertically over the target electrode 13 to provide the usual scanning fields and frames.

Considering the operation of that portion of the invention thus far described, the cathode 2 emits electrons which are formed into a pencil-like beam of conventional shape and size which follows the essentially axial path indicated by the reference numeral 18. The deflecting yoke 17 deflects this beam in the usual manner, and as illustrated in Fig. 1 has deflected the beam upwardly toward the top portion of the face plate 11. Considering that the electrode rings 9 and 10 are not present in the tube, the beam would follow the path 19 which is extended outwardly by the dashed line 20 to intersect the face plate 11 as shown. However, by use of the ring electrodes 9 and 10, an electron lens is provided which turns or bends the beam into substantial coincidence with the radius $R_1$ as shown. Since the radius $R_1$ is perpendicular or normal to the inner surface of the face plate 11, it is thus seen that the beam follows a scanning path which normally is perpendicular to the face plate. The electron lens 9, 10 is so constructed and arranged in combination with the other electrode elements of the tube such that this perpendicular path is achieved regardless of the position of the beam within its scanning field. Further significance of this particular electron lens influence will be explained more fully in the following.

Figure 4:
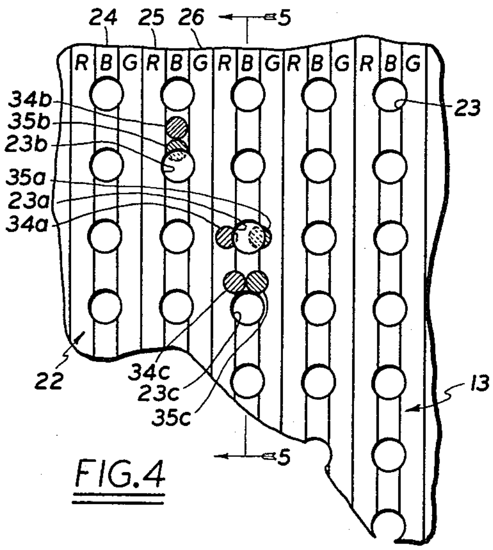
Fig. 4 is a fragmental front elevation of the apertured target electrode showing the various phosphor strips thereon.
Figure 5:
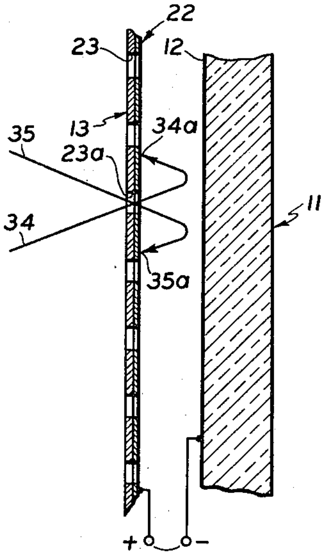
Fig. 5 is a fragmental sectional illustration showing the target and mirror electrodes in operative relationship.

Considering Figs. 4 and 5 in conjunction with Fig. 1, the target electrode 13 is composed of a metallic sheet which is apertured in parallel vertical rows, as seen more clearly in Fig. 4. The particular spacing between rows and the sizes of the apertures may vary to suit design requirements, but the essential features will become apparent from the following description.

On the front face of the electrode 13 (adjacent the face plate 11) is applied the usual luminescent phosphors 22, which, as shown in Fig. 4, may be arranged in parallel strips with the same color strips substantially coinciding with the respective vertical rows of target apertures 23. As shown in Fig. 4, the blue strips 24 of phosphor (indicated by the letter "B") substantially coincide with the respective vertical rows of apertures 23, and the red and green strips lie to the left and right sides respectively thereof. Preferably, the strips are made of such width that the diameter of the apertures 23 is slightly larger. The importance of this dimensional relationship will become apparent from the following.

As the electron beam is scanned over the back surface of the target 13, it will pass through respective apertures along a path substantially perpendicular to the film 12. By reason of a suitable electrostatic field obtaining between film 12 and target 13, the beam electrons will be rapidly decelerated and turned back along a reflex path toward the target 13. Thus, the film 12 may be characterized as a mirror electrode. With the electron beam following a path through an aperture 23 which is perpendicular to the mirror surface 13, the beam will be turned backward upon itself and will again pass through the aperture 23 and will not strike a phosphor area. All of the tube electrodes which have an effect upon the beam are arranged such that the perpendicular beam will focus at or near the aperture. This focusing feature will be explained more fully in connection with Fig. 8.

Figure 6:
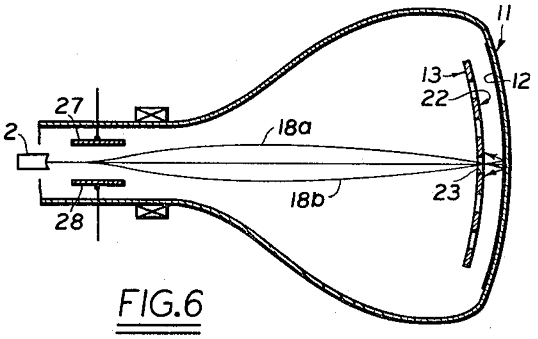
Fig. 6 is a longitudinal sectional view in diagram form of the tube of Fig. 1, this figure being used in the explanation of operation of this invention.

Now with reference to Fig. 6, which is a diagrammatic illustration of the tube thus far described, by placing a pair of conventional deflection plates 27 and 28 on opposite sides of the beam and immediately adjacent the cathode 2, the beam 18 may be bent from its perpendicular path but will by the influence of the various electron lenses (to be explained later) be caused to return through the same target aperture 23, but at an angle, as shown by the curved path 18*a* (Fig. 6). The mirror electrode 12 reflects the beam along a path corresponding to this angularity such that the beam will impinge the front face of the target 13 to the corresponding side of the aperture 23. In Fig. 6, the path 18*a* indicates that a potential has been applied to deflection plates 27 and 28 which bows the beam upwardly such that it passes through the aperture at an angle to be reflected downwardly by the mirror 12 as shown. By having suitable potentials applied between the target 13 and the mirror 12, the beam will cause luminescence of whatever phosphor area it impinges, and if the red phosphor strips 25 are positioned beneath the apertures of Fig. 6, a red spot will be produced. Should the deflection plates 27 and 28 have an opposite potential applied thereto, the beam will be offset along the path 18*b* such that it will pass through the aperture 23 at an upward angle so as to strike the front of the target 13 at the upper side of the aperture 23. Whatever color of phosphor is adjacent this particular side of the aperture 23 will therefore luminesce, such as the green phosphor 26.

Thus it is seen that by offsetting or bending the beam 18, 19 as illustrated in Fig. 1 from its path which is normally perpendicular to the mirror surface 12, the beam may be caused to impinge a particular one of the three phosphor strips 24, 25 or 26, as desired. By offsetting the beam in one direction, the path will return from the mirror to impinge, for example, a red strip. Opposite offsetting of the beam will cause its path to intersect a green strip. Orthogonal offsetting will cause the beam to impinge the blue strip.

Figures 2, 3:
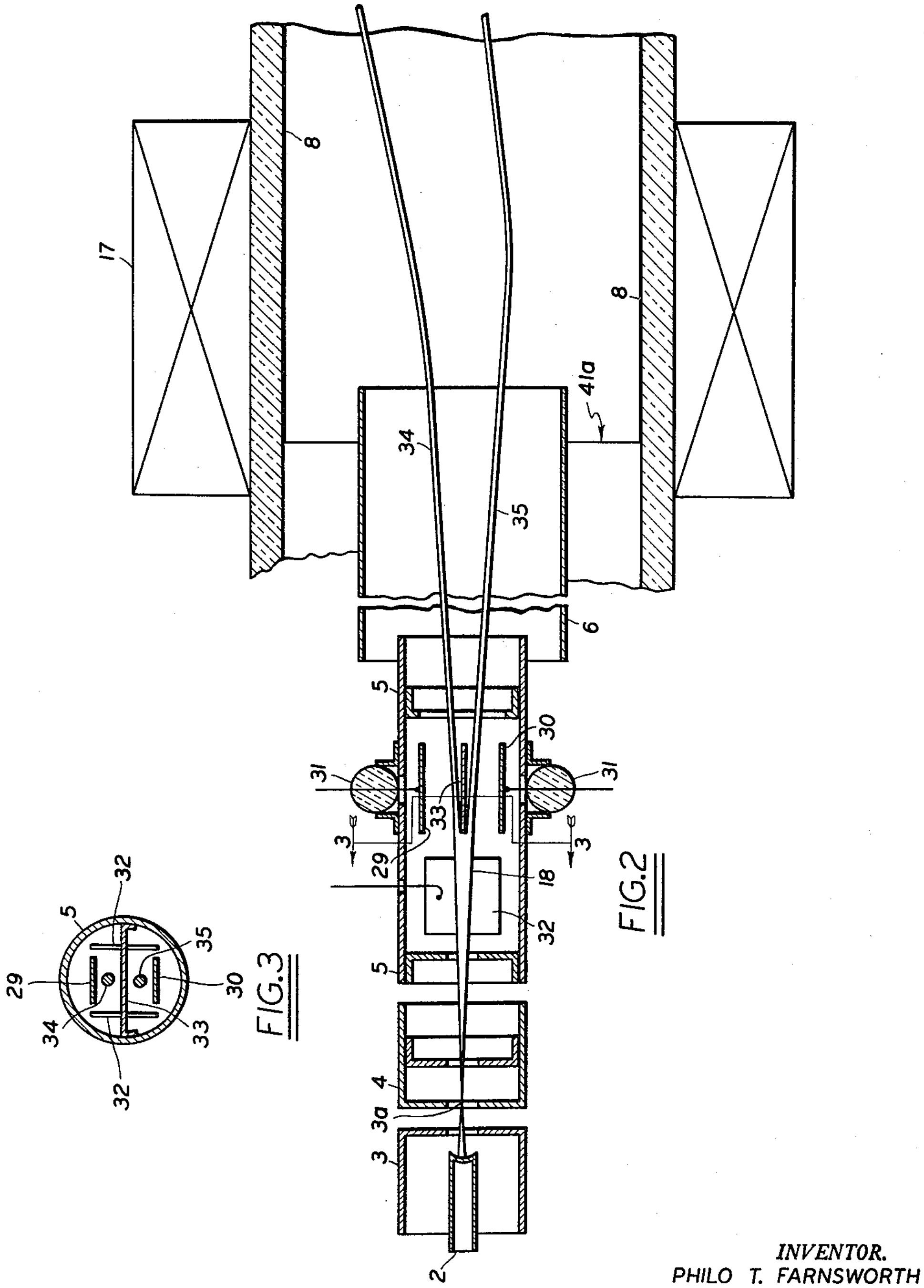
Fig. 2 is an enlarged fragmental section of the tube shown in Fig. 1.
Fig. 3 is a cross-sectional view taken substantially on section line 3—3 of Fig. 2.

The following description deals principally with that portion of the tube which accomplishes the feature of offsetting or bending the electron beam such that instead of following the path which is perpendicular to the mirror surface 12 it will be angularly offset therefrom in such a manner as to reproduce a picture in substantially natural color. The diagrammatic plates 27 and 28 (Fig. 6) are contained inside the tubular anode 5 in Figs. 1, 2 and 3, and find their equivalent in the two deflection plates 29 and 30 which are parallel to each other and to the beam axis. These plates 29 and 30 are insulated from the anode 5 and have leads passing therefrom through suitable insulating glass beads 31 (Fig. 2). A pair of parallel deflection plates 32 mounted in planes at right angles to the two plates 29 and 30 are positioned adjacent the beam path as shown (Fig. 3) and serve to offset the beam in a direction at right angles to that of the two plates 29 and 30.

Diametrically supported inside the anode 5 is a suitable conductive partition 33 which is positioned in the axial path of the beam 18 such that the beam will normally be divided into two streams which pass respectively over and under the partition 33. Thus, with the partition being at the same potential as the anode 5, the two plates 29 and 30 can act independently upon the respective adjacent beams without any substantial interference from the other plate.

This results in two beams which are close together and which follow substantially the same path in the respective scanning movements over the target 13. These beams are indicated by the reference numerals 34 and 35, respectively (Figs. 2 and 3).

With the phosphor strips 24, 25 and 26 arranged vertically and the two deflecting plates 29 and 30 parallel thereto, the two beams 34 and 35 may be offset to the right or to the left individually and independently with respect to each other. With the deflection plates 32 mounted in horizontal planes substantially perpendicular to the phosphor strips, any deflecting or offsetting action by these plates will serve to move the beam in the direction of the strips.

With no signal applied to any of the color plates 29, 30 and 32, the two beams 34 and 35 will be directed by means of the electron lens (to be described in full detail later) through the target apertures 23 perpendicularly to the mirror 12. By application of a suitable potential to the plate 29, for example, the beam 34 can be offset toward this plate such that the beam path will, in effect, be bent to pass through the respective target apertures 23 at an angle and be reflected back onto a phosphor area on the front face of the target 13. As will now be apparent, the amplitude of potential applied to this plate 29 will determine the degree of beam offsetting or bending which in turn determines the point on the target 13 which is impinged by the beam. The tube electrodes and elements are so arranged that with no signal on any of the deflection plates the beams will pass through the apertures 23 and be reflected in a reflex curve to pass back through the same apertures. With a small amplitude signal applied to a deflection plate 29, 30 or 32, the beam will be slightly offset such that part of it may strike a phosphor adjacent the target aperture with the remaining electrons in the beam passing back through to be collected thereafter by the back side of the target 13 or by the coating 8.

The effect of amplitude of a color signal voltage applied to the color plates 29, 30 and 32 is illustrated in Fig. 4. Considering this Fig. 4 in connection with Figs. 1, 2 and 3, and assuming that different amplitude voltages are applied to the two plates 29 and 30 with the voltage applied to plate 29 exceeding that on plate 30, the cross-hatched areas 34*a* and 35*a* in Fig. 4 will illustrate the relative phosphor areas covered by the two beams 34 and 35 adjacent the particular aperture 23*a* through which the two beams pass. The voltage on the plate 29 exceeding that on the plate 30 causes the beam 34 to impinge more to one side of the aperture 23*a*. With the smaller off-setting voltage applied to plate 30, a smaller cross-sectional area of the beam 35 will fall onto the target phosphor as indicated by the crescent shaped area 35*a* (Fig. 4). From this it will be apparent, assuming other things equal, that more light will be emitted from the area 34*a* than from the area 35*a* by reason of the larger area of beam coverage. By varying the potential on plates 29 or 30, brightness of phosphor luminescence may be controlled. In the instance just described, the spot 34*a* produces a red color, and the spot 35*a* produces a green color of less brightness.

In order to obtain a pure blue color, no voltage is applied to either of the color plates 29 and 30 and a voltage of suitable amplitude is applied to the blue color plate 32. This offsets the beam 18 in a direction such that the two beams 34 and 35 pass through, for example, selected aperture 23*b* at an angle such that the mirror electrode reflects the beam to impinge the spots indicated by the reference symbols 34*b* and 35*b*. It has now been shown how the colors red, green and blue may be separately obtained. In order to produce white, it is necessary that the two beams 34 and 35 strike all three color phosphors simultaneously, and this condition is produced when suitable voltages are applied to all three color plates 29, 30 and 32 to offset the two beams 34 and 35 oppositely and orthogonally simultaneously. In Fig. 4, this is demonstrated by the cross-hatched spots 34*c* and 35*c* which are offset laterally and above with respect to the aperture 23*c* sufficiently to overlap the adjacent blue, red and green phosphors. Various shades of white are obviously produced by causing the beams to impinge one of the phosphor strips more than the others.

To further illustrate and explain the aforementioned reproduction of color spots, the cross-sectional diagram of Fig. 5 will show the angles at which the two beams 34 and 35 pass through the particular aperture 23*a* to produce the two color spots 34*a* and 35*a*, respectively. It will be understood, of course, that no particular aperture in the target 13 is intended to be indicated by any of the reference aperture numerals 23*a*, 23*b* and 23*c*, since these are illustrative of any aperture over the target area.

Figure 7:
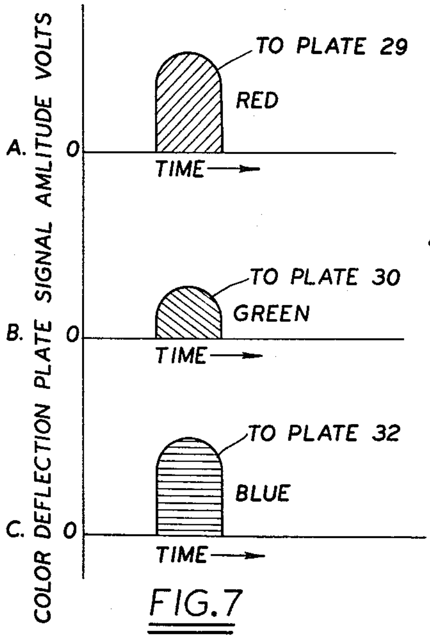
Fig. 7 are wave forms of representative color signals used in explaining this invention.

In further illustrating suitable potential conditions on the color plates 29, 30 and 32 in order to produce the white spot 34*c*, 35*c*, suitable graphs have been presented in Fig. 7 showing possible relationships between voltages which may be applied to these three plates simultaneously. These graphs do not correspond to practical conditions but are merely representative to show relative amplitude between voltages for obtaining a white spot. In a practical situation, there is no such voltage wave form as those disclosed, but instead a constantly varying voltage of color information.

Having now described those parts of the invention which are essential for producing either one or a mixture of the colors red, green and blue, the following description will be directed more to a circuit arrangement for applying the necessary video and color signals to the tube 1 for reproducing a picture in substantially its natural color. Reference is made to Fig. 1 where is shown in block diagram form a conventional color television receiver. The block 36 represents the usual RF, IF, detecting, scanning and video circuits of the receiver. A line connects this block with the scanning yoke 17 for producing the usual scanning operation of the electron beam or beams over the target electrode 13. The particular color circuitry utilized in connection with this invention is illustrated by the remaining blocks which are characterzed as indicated in the drawing and assigned reference numerals 37, 38, 39 and 40, respectively. The four terms "luminance," "I decoder," "Q decoder" and "chrominance" now have well-recognized meanings in the art and need not be further defined herein. The adopted standards of the F.C.C. provide definitions for these terms as well as the publications in the aforementioned Proceedings of the I.R.E., January 1954. Essentially, the luminance circuit 37 provides fine detail video information in all three of the colors red, green and blue, this composite color information being coupled to the grid electrode 3 of the tube 1. This information being of variable amplitude, the grid 3 modulates the intensity of the electron beam. The individual color signals characterized as blue, green and red are delivered through separate channels or couplings to the individual color plates 29, 30 and 32, as shown. These individual signals are also in the form of varying amplitude voltages which offset the electron beam, as explained hereinbefore. This circuitry is conventional, such that the tube 1 may be easily adapted to existing circuitry for reproducing a color television image.

Suitable voltages are applied to the various electrodes 2, 4, 5, 6, 8, 9, 10 and 12 as illustrated, the cathode 2 and the mirror 12 being at a suitable reference potential and positive potentials being applied to the remaining electrodes. As practical examples, 500 volts may be applied to anode 4, 1500 volts to anode 5, 3500 volts to anode 6, 5,000–7,500 volts to coating 8 and electrode 9, and 12,000–18,000 volts to electrodes 10, 13. While the film 12 is shown connected to ground, such connection is not absolutely necessary since the cathode potential may be imparted thereto by the beam electrons. In this case, the film 12 should be composed of material having a secondary emission ratio of less than unity.

It will now appear that the fine detail information delivered by the luminance circuits 37 will serve to modulate the intensity of the primary beam 18 which is delivered to the color-determining electrodes 29, 30 and 32. The blue, green and red color information derived from the chrominance circuits 40 which are coupled to the respective color plates 29, 30 and 32 serve to offset or bend the beam sufficiently to cause beam impingement on the proper elemental area of the target phosphor surface 22. Since the individual chrominance signals vary in amplitude, it is seen that some color modulation is derived therefrom, because a high amplitude signal will cause substantially the entire beam to impinge the corresponding phosphor strip, whereas a low amplitude signal will cause only partial beam impingement on the corresponding phosphor strip. Thus, by the combined effects of both the luminance and chrominance signal information being applied to the different tube electrodes, a clear, highly defined color image is reproduced on the phosphor viewing surface 22.

While it would appear that splitting the primary beam 18 into a plurality of secondary color-producing beams will result in the production of a corresponding number of separate spots on the phosphor screen, this is not true, because the separation between the various beams and the resulting spots is smaller than the size of an elemental picture area. Thus, the individual spots simultaneously produced by the plurality of beams will appear as one spot to the eye. As explained eleswhere, an elemental picture area may contain several of the target apertures, since such apertures are relatively small as compared to an elemental picture area.

While the luminance information has been explained as being applied to the grid 3, it will appear upon closer examination that it need not be applied to this particular electrode for reproduction of a substantially natural color image, because it is possible to produce any desired color, including white, of any desired brightness from the chrominance information on the color-selecting electrodes alone.

Figure 8:
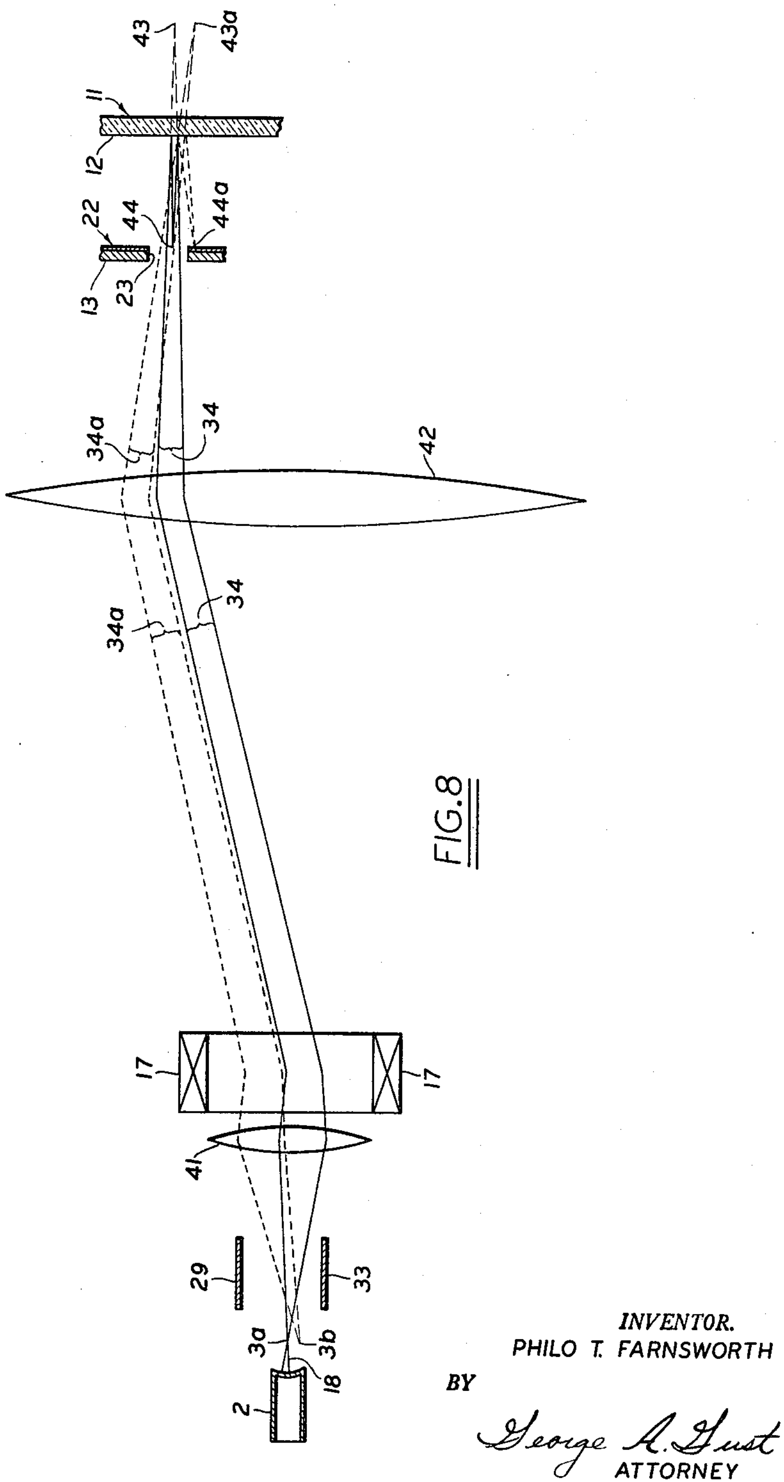
Fig. 8 is a diagrammatic illustration of an optical equivalent of the electron lens arrangement of the tube of Fig. 1, this illustration being used in explaining the operation of the invention.

Considering now some of the detailed points of design of the tube 1, an ideal theoretical optical analogy to the electron lens arrangement of the tube 1 will now be given. Reference is made to Fig. 8 for an illustration of this optical analogy wherein like numerals will represent like parts, with the two axially spaced optical lenses 41 and 42 representing the electron lens effect between the anode 6 and coating 8 and the rings 9 and 10, respectively. The optical lens 41 may be considered as positioned at axial point **41*a* in the tube 1 and the lens 42 at point 42*a*. The effective position of the scanning coils 17 relative to these lenses 41 and 42** is likewise shown in Fig. 8.

Consider first the beam 34 with no color signals applied thereto as shown in full lines; i.e., no bending or offsetting occurs. This beam is considered as originating from the electron crossover point **3*a* near cathode 3; passes without change between the color-bending plates 29, 33; is made slightly convergent by lens 41, deflected by the scanning coils 17 and thereafter brought to final focus by lens 42 at point 43 which preferably lies beyond (in front of) face plate 11. However, by reason of the reflecting action of the mirror 12, the actual beam cross-over occurs at point 44 inside aperture 23. The electrons passing back through this aperture are then collected by the gun side of the target 13 or by the wall coating 8**.

It is essential that the axis of the beam 34 follows a path through target 13 substantially perpendicular to mirror 11, and the proper design (position of coils 17, focal lengths of lenses 41 and 42, respectively) insures this condition. Otherwise, the electrons returning from the mirror would not all pass through the target aperture.

Consider now the beam **34*a*, shown in dashed lines, as being bent by color signals on plates 29 and 33. Beam 34*a* passes through the lens system 41, 42 and the scanning coils 17 in the same way as the undeflected beam 34 and tends to focus near point 43 at 43*a*. It is true that the individual rays of beam 34*a* virtually come not from the crossover point 3*a*, but from an offset point 3*b*, and thus the focus of the beam near the target, which is the image of 3*b*, will also be correspondingly displaced from 43. This can interfere with the preferred operation of the device. But in the latter part of this specification, means will be shown to overcome this deficiency; that is, to bring points 3*a* and 3*b* nearly into coincidence, and therefore to focus beam 34*a* at the point 43*a* which lies close to point 43**.

Passing through the aperture at an angle, the beam **34*a* is angularly reflected as shown by the mirror 12. The returning electrons impact the phosphor layer 22 at point 44*a* which lies at the return electron crossover and which is the conjugate of point 43*a***. As shown, the beam 34*a* corresponds to almost one hundred percent (100%) of the maximum brightness attainable for the color of that phosphor impinged, since all of the beam electrons strike the phosphor.

Perfect lens action has been assumed while actually some spherical aberration will be present which tends to shift point 43, 43*a* to the left for the more deflected beams (by scanning coils 17). This shift, however, is in a direction which aids focusing, thereby utilizing such aberration to good advantage.

The details of electrode construction are properly a matter of design which must be such as to meet the conditions listed hereafter:

(*a*) With or without chrominance signals on plates 29 and 33, the primary electrons coming from lens 42 should all pass through the same selected aperture 23.

(*b*) Without a chrominance signal, the beam should follow a path toward the mirror surface perpendicularly, and the reflected electrons should again pass through aperture 23.

(*c*) With a chrominance signal on the plates 29, 33, a fraction of the reflected electrons should miss the aperture and impinge the phosphor layer 22. This fraction may vary from zero to one hundred percent (0 to 100%), depending on the amplitude of the chrominance signal, that is, on the bending angle.

This optical analogy of Fig. 8 as aforesaid is an ideal theoretical explanation of the operation of this invention which may only be approximated in actual practice. For example, a plurality of target apertures in the practical instance will be covered by the cross-sectional area of a given beam which differs from the simplified explanation which shows the action of only a single electron ray through one of these many apertures.

Figure 9:
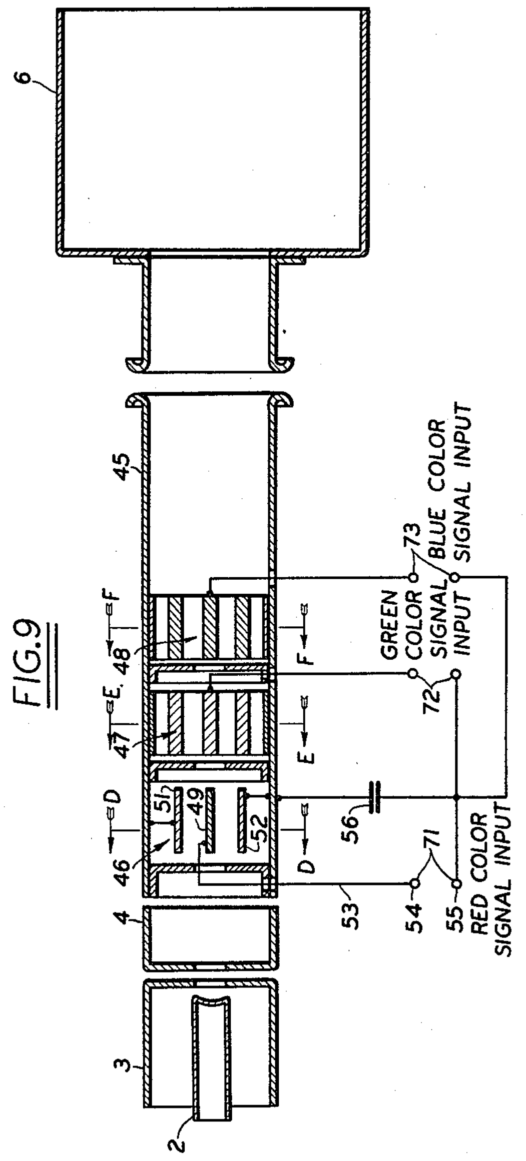
Fig. 9 is a sectional view similar to Fig. 2 showing another embodiment of this invention.
Figure 10:
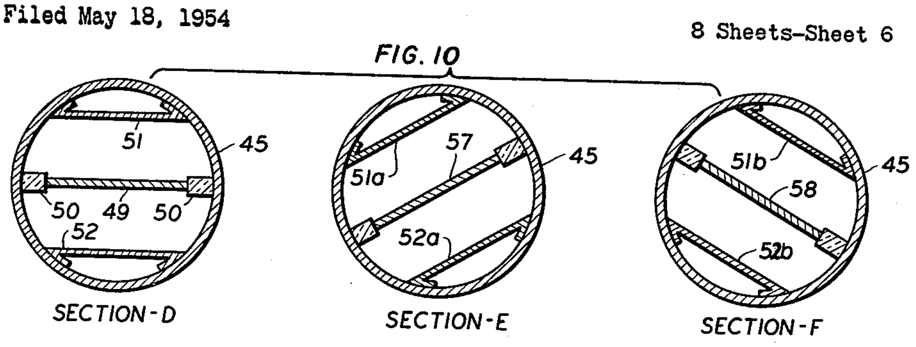
Fig. 10 is an illustration taken on the respective section lines D—D, E—E and F—F of Fig. 9.

In Figs. 9 through 12 are illustrated a different embodiment of this invention wherein the respective offsetting actions of the three color-selecting electrodes are arranged in a 120 degree (120°) cross-sectional pattern instead of the spaced quadrature or orthogonal relationship of the plates 29, 30 and 32. In Fig. 9, the tubular anode 45 corresponds to the anode 5 of the preceding figures. This anode carries the three color-selecting electrodes indicated generally by the reference numerals 46, 47 and 48, respectively. Fig. 10 shows the angular relationship between these three electrodes along the section lines D, E and F, respectively. The three electrodes are constructed identically such that a description of one will suffice for all. Considering the electrode 46 only, the diametral partition 49 is supported in the anode 45 by suitable insulators such as ceramic mounts 50 to provide insulation between this partition and the anode. The two opposite parallel plates 51 and 52 are conductively secured to the anode 45 equidistant from the partition 49. As in the embodiment of Fig. 1, this partition 49 is made of conductive material and is centered on the primary beam axis as was the partition 33 (Fig. 1). A lead 53 is connected to the partition 49 for coupling to the chrominance input terminals 54 and 55. A capacitor 56 couples the terminal 55 directly to the anode 45 and hence to the two plates 51 and 52. The partition 49 functions the same as described in connection with the partition 33 to divide the primary beam into two beams which are thereafter directed toward the respective partitions 57 and 58 of the two color electrodes 47 and 48. The parts of these two electrodes 47 and 48 which correspond to those of the electrode 46 are assigned the same reference numerals (see Fig. 10) but carry letter suffixes.

After the beam splitting action of the partition 49, the two succeeding partitions 57 and 58 divide the beam still further such that six (6) hexagonally arranged beams emerge from the right-hand end of the anode 45. This beam-splitting action is represented graphically in Fig. 11 by considering the primary beam which is directed from the cathode 2 toward the partition 49 as having a cross-section indicated by the circle 59. The three partitions 49, 57 and 58 of the respective electrodes 46, 47 and 48 are indicated by the straight lines 49*a*, 57*a* and 58*a*, respectively. Because of the angular relationship between these three partitions, it will appear obvious from Fig. 11 that the beam is split into six (6) separate beams, indicated by the sectioned circles, arranged in a hexagonal pattern. For the purpose of simplicity the cross-section of the individual beams is shown as circular although this in practice is not strictly true or even necessary. These six beams are directed toward a target electrode in the same manner as previously explained; however, the particular arrangement of the electrode is altered as illustrated by the fragmentary front elevational view of Fig. 12.

As in the case of the electrode 13, this different electrode 13*a* is provided with similar apertures 60 which are intersected with phosphor strips of the same character as those used on target 13 but which are disposed at angles of 60 degrees (60°) with respect to each other. The diameters of the apertures 60 are made substantially larger than the width dimensions of the respective green, blue and red strips 61, 62 and 63, respectively, such that triangles 64 remain on the surface of the target 13*a* which do not carry any phosphor material and are therefore bare. The significance of providing these bare triangular spaces will be explained more fully in the following.

The target 13*a* is oriented in the tube in angular registry with the three color electrodes 46, 47, 48 such that the respective color strips 61, 62 and 63 will be located at right angles to the planes of the respective color electrodes 46, 47 and 48. Thus, the electrodes 46, 47 and 48 may be characterized as red, blue and green color-selecting electrodes, respectively.

Considering Figs. 9, 10, 11 and 12 together, the two diametrically arranged electron beams 65 and 66 (Fig. 11) serve to produce the red color by impinging the phosphor strip 63 at the indicated spots 65*a* and 66*a*, respectively. Similarly, the beams 67 and 68 lying on opposite sides of the partition 58 produce the blue spots 67*a* and 68*a*, respectively. Also similarly, the two beams 69 and 70 produce the two green spots 69*a* and 70*a*, respectively.

The red, green and blue channels leading from the chrominance circuits 40 of Fig. 1 in operation are coupled to the input terminals 71, 72 and 73 (Fig. 9) which are in turn suitably coupled to the color electrodes 46, 47 and 48. With no color signal applied to these color electrodes, the composite beam 65, 66, 67, 68, 69, 70 passes through the respective target aperture 60 to be reflected oppositely backwardly therethrough without exciting any of the phosphor strips. With the application of a full intensity red signal to the electrode 46, equal but oppositely directed voltage gradients will appear between plates 49, 51 and 49, 52, respectively, whereby the two beams 65 and 66 will be offset oppositely by equal amounts to pass through the illustrated aperture 60*a* at such an angle as to be reflected back onto the red strip 63 on diametrically opposite sides of the aperture to produce the circular spots 65*a* and 66*a*, respectively. Considering now that a green signal is applied to the terminal 72 of such amplitude as to produce a hue of green of only half color depth, the two beams 69 and 70 will be bent or offset from the partition 57 in amount sufficient to position beam impingement upon the sectioned crescents 69*a* and 70*a*, respectively. Since only one-half of these respective beams strike the phosphor, it will be seen that only a corresponding area of the impinged phosphor will be excited. The electrons which do not strike the phosphor will pass back through the aperture 60*a* to be collected by the target 13*a*.

An even lower hue signal applied to the terminal 73 of the blue electrode 48 will produce even smaller angular offsetting of the two beams 67 and 68 which impinge the illustrated crescent-shaped spots 67*a* and 68*a*. The remaining electrons pass back through the aperture 60a to be collected as before.

From the foregoing explanation, it is thus seen that any shade or mixture of colors may be obtained by applying corresponding potentials to the color electrodes 46, 47 and 48. Full intensity white is obtained, as is now obvious, by applying maximum amplitude color signals to the three terminals 71, 72 and 73 such that the beams will fall completely onto the respective color strips as is illustrated by the two spots 65a and 66a. Luminance information may be applied to the grid electrode 3 the same as in connection with the embodiment of Fig. 1.

Color purity is assured by the presence of the bare triangular area 64 on the target 13a. Should the respective beam 65, 66, 67, 68, 69, 70 of Fig. 11 be oversize, it would overlap onto the adjacent bare triangles as illustrated by the two dashed line circles 74. Since overlapping of these circles onto the bare area 64 has no effect to produce other colors, it is thus seen that color purity is insured.

It is characteristic of the embodiment just described that for each component color (red, blue or green) two spots appear on the phosphor plate, which move in opposite directions away from the aperture as the color content increases. It is, of course, possible to omit the beam-splitting electrodes 49, 57 and 58 in Fig. 10, so that only three instead of six spots would appear in Fig. 11, and such a system is operable. However, the beam-splitting feature is advantageous in that it is less sensitive to noise. In the present color television system, the chrominance information is transmitted on one carrier, and the luminance on a closely adjacent carrier. Any noise burst is then likely to affect all six spots simultaneously, moving these spots, e.g., away from the aperture. The result is to increase the brightness of all spots, or effectively, to add white to the instantaneous color, thus making it less saturated. Without the beam-splitting feature, however, the ratio of red-to-green-to-blue would be changed by the noise pulse, so that the noise would falsify the color hue. This would be much more disturbing to the eye than a mere change in saturation to which the eye is rather insensitive.

What has here been stated about noise also applies to the effect of scanning non-linearity or to errors due to spherical aberration of the main lens 42, or to the absence of parallelism between the target and mirror electrodes. In all of these cases, the beam-splitting will be found beneficial in fundamentally the same way as a push-pull circuit tends to minimize non-linearities in electrical signals.

Referring once again to Fig. 6, it will be noted that all of the rays which include 18a and 18b intersect at a common point within the aperture 23. This common point is actually the image of the illustrated center of deflection within the color-selecting plates 27, 28, such image being produced by the intervening electron lenses. But since there are a plurality of spaced color-selecting electrodes, as illustrated in Figs. 2 and 9, there would be as many spaced image points along the beam trajectory. Preferably, these image points should substantially coincide in the center of the aperture 23, which condition can only be achieved if the corresponding three centers of deflection of the color-selecting electrodes are brought into virtual coincidence.

Figures 11, 12:
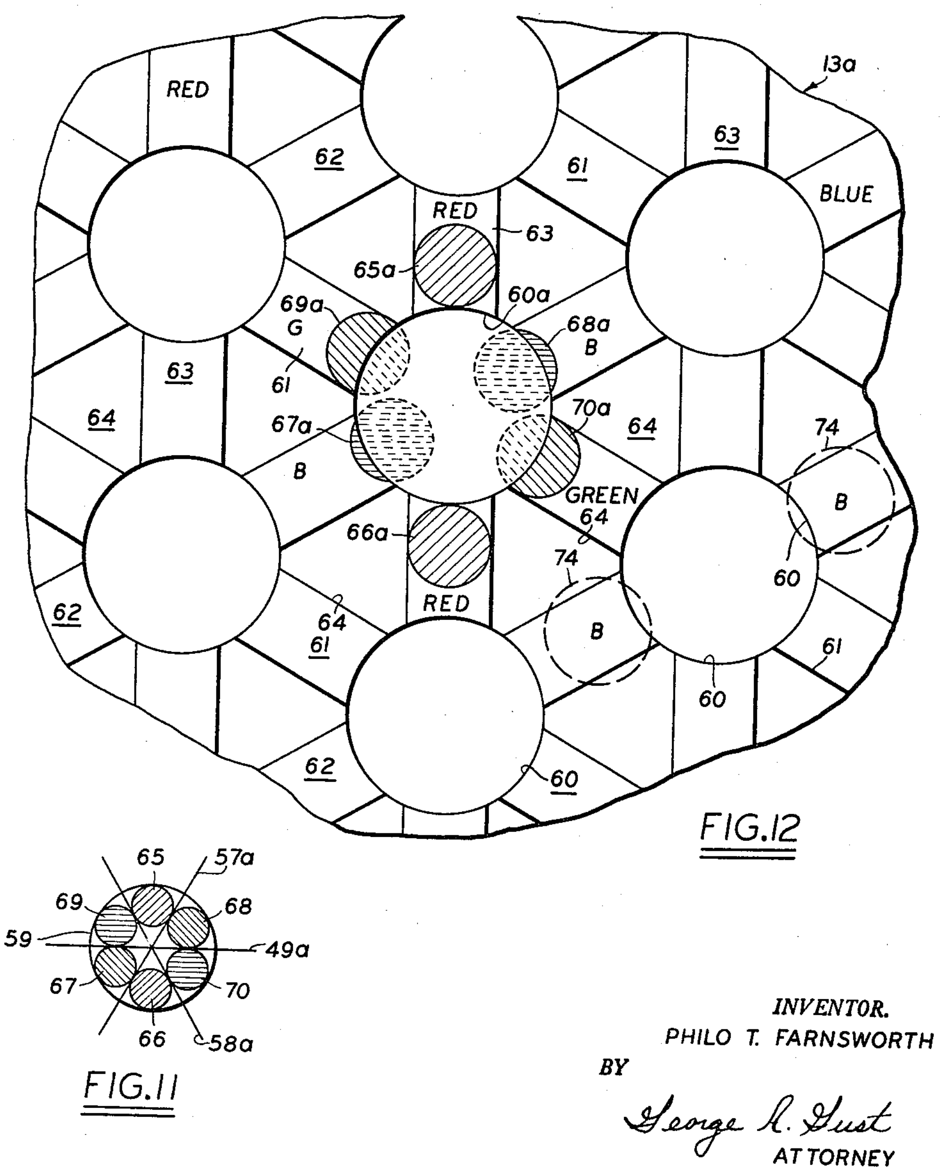
Fig. 11 is a diagrammatic illustration of an electron beam produced by the arrangement of Figs. 9 and 10.
Fig. 12 is a fragmental front elevation of a different embodiment of the viewing screen of Fig. 4.

By means of the alternative color-selecting electrode arrangement illustrated in Figs. 13, 14 and 15, this coincidence condition is more nearly achieved than in the previous embodiments. This color-selecting means is essentially the same in its principal features to that of Fig. 9, the beam-bending plates being angularly oriented the same and the beam being divided into six parts as illustrated in Fig. 11. It should, however, be understood that an arrangement equivalent to the one now to be described may also be used in connection with the embodiment illustrated in Figs. 1, 2, 3 and 4. The different color-selecting electrodes, generally indicated by the reference numerals 74, 75 and 76, and 74a, 75a and 76a respectively correspond to the electrodes 46, 47 and 48 of Fig. 9. Since each of the three electrodes 74, 75 and 76, and each of the three electrodes 74a, 75a and 76a are substantially identical to each other, respectively, description of one of each set will suffice for the others.

The electrodes 74, 75 and 76 may be substantially identical to electrodes 46, 47 and 48 of Fig. 9, and are positioned in the left end of the anode sleeve 77. The electrodes 74a, 75a and 76a are grouped together and mounted in the right-hand end of the sleeve 77 in spaced relation to the electrodes 74, 75 and 76. These electrodes 74a, 75a and 76a are constructed and positioned in the sleeve 77 as counterparts of the respective electrodes 74, 75 and 76 as will be explained in more detail in the following. In construction and in operation, electrodes 74 and 74a together serve as a single beam-bending electrode unit, electrodes 75 and 75a constitute another unit, and electrodes 76 and 76a comprise a third unit. Considering the electrode unit 74, 74a only (as illustrated diagrammatically in Fig. 15), the conductive partition in the electrode 74 is a diametral plate 78 suitably supported in conductive engagement with anode sleeve 77 as shown in section G of Fig. 14. Partition 79 of electrode 74a (section H of Fig. 14) is mounted between two supporting ceramic or the like insulators 80 so as to be insulated from the anode sleeve 77. The color-bending plates associated with the partition element 78 are indicated by the reference numerals 81 and 82. The color plates associated with the partition 79 are indicated by the reference numerals 83 and 84, respectively. The plates 81 and 82 are spaced from and parallel to the partition 78 and are supported by ceramic or the like mounts 85 and 86, respectively. The plates 83 and 84 are similarly positioned with respect to the partition element 79, but are conductively secured to the anode sleeve 77 as shown by section H of Fig. 14. The two plates 81, 83 lie in parallel planes and resemble the single plate 51 of Fig. 9, and the two plates 82, 84 are also parallel and resemble the plate 52 (Fig. 9).

As will be apparent from the sectional view of Fig. 13, the axial or width dimensions of the plates of the electrode sets 74, 75, 76 and 74a, 75a, 76a, respectively, as well as the separation thereof, are different, and the reason for this dimensional difference will be explained later. Suitable discs 87 between the respective electrodes 74, 75 and 76 provide masking apertures 88, respectively. Similar discs 87a between the various electrodes 74a, 75a, 76a similarly provide somewhat larger apertures 88a.

Chrominance signals are applied to the various electrodes (74, 74a), (75, 75a) and (76, 76a) through terminals 71a, 72a and 73a, respectively, in the same manner as illustrated in Fig. 9; however, the respective electrode elements are preferably connected together in the manner shown in Fig. 13. Partition 79 is conductively connected to plates 81 and 82, and partition element 78 is conductively connected to color plates 83 and 84 through the metal of the anode sleeve 77. The various partitions and color plates of the other two electrodes (75, 75a) and (76, 76a) are similarly connected together.

The operation of this embodiment 13 is illustratively demonstrated by Fig. 15 which will now be described. Like numerals will indicate like parts. Only the color-selecting electrode unit (74, 74a) is shown in Fig. 15, this being in diagram form. The primary electron beam as it issues from the cathode follows the axial path 89 until it divides around the partition 78 to provide the two color beams 90 and 90a. Considering only the beam 90 for the moment, a deflecting signal of the polarity indicated applied to the plates 78 and 81 serves to incline the beam upwardly as shown. The same signal on these electrodes also appears on the adjacent plates 79 and 83 but in opposite polarity such that the beam will be angled downwardly. The angles of deflection produced by the adjacent electrode assemblies 78, 81, 82 and 79, 83, 84 are so selected that a backward projection of the beam segment 91 will intersect the original beam 89 axis at a particular point 92. As will appear to a person skilled in the art and as can be proven by optical analogy, the beam 90, 91 as it leaves the plates 79, 83 appears to originate from the point 92.

The plates and partitions of the three color-selecting electrodes (74, 74*a*), (75, 75*a*) and (76, 76*a*) are so arranged as to cause the backward projections of all of the respective divided beams to intersect essentially at the same point 92. By doing this, all of the color beams issuing from the color-selecting electrodes will appear to originate from a single point 92, and will therefore be imaged into a single point which should lie at the center of target 23.

Referring once again to Fig. 8, it is seen that the cathode crossover point 3*a* is imaged by the electron optical system into point 43 (which then is imaged by the mirror into point 44). This is necessary in order to obtain a small luminous spot on the target phosphor for producing satisfactory resolution. However, the same optical system images the virtual deflection point 92 (Fig. 15) into the aperture 23. Since the aperture 23 is disposed to the left of the focal point 43 (Fig. 8), it follows that the deflection point 92 (Fig. 15) must lie to the left side of the fixed cathode crossover point 3*a* (Fig. 8). The actual position of point 92 with respect to point 3*a* is determined by the characteristics of the particular electron optical system. Means for altering the position of point 92 are explained hereafter. It should also be borne in mind that, between indicated points 90 and 92 in Fig. 15, an eletctron lens is formed between electrodes 3, 4 and 77 (Fig. 15) which will affect the virtual position of point 92 which may also be affected by varying potentials on the electrodes and the size and spacing thereof for adjusting the axial position of point 92.

Various methods are available for achieving this common vitrtual beam origination point 92 such as varying either axial or radial spacing of the various color plates from each other until the proper beam angles are obtained. The position of point 92 can be affected by varying the axial distance "*m*" (Fig. 15) between the two assemblies 74 and 74*a*. Variation may also be obtained by altering the spacing between the plates 83 and 84 and the respective partition 79 as indicated by the reference letter "*n*," or by similarly altering the spacing between the plates 81, 82 and partition 78. Additionally, instead of applying the same potentials between the elements of the same color-selecting electrode (for example, electrodes 74, 74*a*), different controlled voltages may be applied which will produce the necessary deflection of the beam to achieve the virtual origination point 92. In this event, the direct connections between respective color plates and partitions will be replaced by signal-supply circuits.

Also, the width or axial dimensions of the respective color plates may be altered to the end of achieving the virtual point 92.

By constructing and operating the invention as just described in connection with Figs. 13, 14 and 15, more accurate focusing of all the color beams adjacent the target electrode 13, 13*a* is achieved. It will be obvious that regardless of the magnitude of signal applied to the individual color electrodes (74, 74*a*), (75, 75*a*) and (76, 76*a*) the virtual point of beam origination 92 will not change. Instead of the beam being deflected to one side or the other of the various target 13, 13*a* apertures by the color electrodes, the beam is more nearly bowed or bent, as explained in connection with Fig. 6.

As mentioned in the preamble hereof, there is no particular problem of registration of the target apertures with the electron gun or of the apertures with the phosphor material. The only registration problems involved in this invention are aligning the color electrodes with phosphor strips and aligning the phosphor strips with the target apertures. While only a single electron gun is disclosed, it is obvious that three different guns may be triangularly arranged around the beam axis to produce the respective individual color-producing beams described hereinbefore. However, a single gun is preferred both from cost and operational standpoints. Therefore, the scope of this invention is not limited to a single gun arrangement, and the invention is, therefore, defined in a number of the claims to cover broadly this alternative design feature.

Wherever in the claims the term "target aperture" or the equivalent is used, it is intended that such term also include the practical instance of a plurality of apertures as may be covered by the cross-sectional area of an electron beam or beams. Similarly, while claim language specifies only a single "electron beam" as acting on the apertured target 13, 13*a*, it is intended that a plurality of such beams be included in the meaning for covering the alternative embodiments of using either a single scanning beam or a plurality of scanning beams as previously described.

Further, certain claim language requires that an electron beam focus at a "given point" in the vicinity of said target electrode under different operating conditions. The fact that this "given point" will vary somewhat in position as operating conditions change is intended to be included in the meaning of this term.

The terms "beam bending" and "beam offsetting" are used synonymously throughout to mean that the usual pencil-like beam of electrons is not displaced laterally at the target (within practical limitations, of course) when acted upon by the color-bending electrodes.

While there have been described what are at present considered the preferred embodiments of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. Apparatus of the character described comprising a cathode ray tube including means for forming an electron beam along a predetermined path, means for dividing said beam into at least two portions, a luminescent screen disposed in the path of said beam, said screen being composed of a plurality of color-emissive groups, each group being composed of a plurality of different color-producing areas, said areas being disposed closely adjacent to each other, said areas further being composed of materials which emit light upon being bombarded by electrons, second means for directing said two portions of said beam onto selected areas of said groups, said areas being so closely spaced and being of such size that said beam portions under the direction of said second means can impinge one area or a plurality of said areas simultaneously, and third means included within said second means for shifting selectively each of said two beam portions in at least two different transverse directions on said luminescent screen.

2. A color television picture apparatus comprising a picture screen provided with material which luminesces under electron bombardment, said material being composed of a plurality of color-emissive groups, each group containing a plurality of different color-producing areas, said groups being disposed adjacent one another, electron beam-registering means associated with each group for momentarily holding a scanning beam on the group, an electron gun adapted to emit an electron beam, beam-splitting means for dividing said beam into at least two portions, beam-controlling means cooperatively associated with said beam-registering means for directing said two beam portions onto said groups in orderly sequence said beam-controlling means including means for shifting selectively said two beam portions in transverse directions over said picture screen for causing the beam portions to impinge a selected one or to impinge simultaneously a selected combination of the areas of each group.

3. A color television picture apparatus comprising a picture screen provided with material which luminesces under electron bombardment, said material being composed of a plurality of color-emissive groups, each group containing a plurality of different contiguous color-producing areas, an apertured mask for said screen having electron beam-receiving apertures registered with said groups respectively, an electron gun for producing only two electron beams, means for scanning said beams over said mask for directing said beams onto said groups in orderly sequence, first beam-controlling means acting on both of said beams for shifting them simultaneously in one and the same direction, second beam-controlling means acting on said beams individually for shifting them simultaneously in directions transverse to said one direction, and means for directing said beams through each respective aperture whereby operation of said first and second beam-controlling means causes said beams to impinge either one or a selected combination of each group areas instantaneously whereby a given color may be reproduced instantaneously.

4. For use in a color television apparatus, a picture screen provided with a layer of phosphor material, said layer being divided into identical groups of color-emissive phosphor, each group being composed of three adjacent areas in side-by-side relation of different color phosphors whereby one of said areas is intermediate the other two areas, a mask having a plurality of apertures registered with respective ones of said groups of phosphor, an electron gun for producing two electron beams, means for scanning said beams over said mask for directing said beams onto said groups of phosphor; said gun comprising a first pair of spaced-apart parallel deflection plates, a second pair of spaced-apart parallel deflection plates, said first pair of plates being normal to and spaced apart in a direction parallel to an imaginary line passing through said other two areas of color phosphors, said second pair of plates being orthogonally related to said first pair of plates, a beam-splitting plate intermediate and substantially parallel to said first pair of plates; and two beam-accelerating electrodes spaced apart and interposed between said mask and said electron gun, said electrodes adapted to have two different potentials applied thereto to serve as an electron lens, whereby said two beams are directed through said mask apertures to impinge selected areas of said phosphor groups.

5. For use in a color television apparatus, a picture screen provided with a layer of phosphor material, said layer being divided into identical groups of color-emissive phosphor, each group being composed of three adjacent areas in side-by-side relation of different color phosphors whereby one of said areas is intermediate the other two areas, a mask having a plurality of apertures registered with respective ones of said groups of phosphor, an electron gun for producing two electron beams, means for scanning said beams over said mask for directing said beams onto said groups of phosphor; said gun comprising a first pair of spaced-apart parallel deflection plates, a second pair of spaced-apart parallel deflection plates, said first pair of plates being spaced apart in a direction parallel to an imaginary line passing through said other two areas of color phosphors, said second pair of plates being orthogonally related to said first pair of plates, a beam-splitting plate intermediate and substantially parallel to said first pair of plates; two beam-accelerating electrodes spaced apart and interposed between said mask and said electron gun, said electrodes adapted to have two different potentials applied thereto to serve as an electron lens, whereby said two beams are directed through said mask apertures to impinge selected areas of said phosphor groups; first circuit means coupling a first chrominance signal to said first pair of plates, second circuit means coupling a second chrominance signal to one of said second pair of plates, and third circuit means coupling a third chrominance signal to the other of sai l second pair of plates, whereby said two beams may be individually controlled to impinge any combination of the three areas of phosphor of said groups.

6. For use in a color television apparatus, a picture screen provided with a layer of phosphor material, said layer being divided into identical groups of color-emissive phosphor, each group being composed of three adjacent areas in side-by-side relation of different color phosphors whereby one of said areas is intermediate the other two areas, a mask having a plurality of apertures registered with respective ones of said groups of phosphor, an electron gun for producing two electron beams, means for scanning said beams over said mask for directing said beams onto said groups of phosphor; said gun comprising a first pair of spaced-apart parallel deflection plates, a second pair of spaced-apart parallel deflection plates, said first pair of plates being spaced apart in a direction parallel to an imaginary line passing through said other two areas of color phosphors, said second pair of plates being orthogonally related to said first pair of plates, a beam-splitting plate intermediate and substantially parallel to said first pair of plates, a tubular anode element surrounding and being insulated from said two pairs of plates, said beam-splitting plate being connected to said anode element; two beam-accelerating electrodes spaced apart and interposed between said mask and said electron gun, said electrodes adapted to have two different potentials applied thereto to serve as an electron lens, whereby said two beams are directed through said mask apertures to impinge selected areas of said phosphor groups; first circuit means coupling a first chrominance signal to said first pair of plates, second circuit means coupling a second chrominance signal to one of said second pair of plates, and third circuit means coupling a third chrominance signal to the other of said second pair of plates, whereby said two beams may be individually controlled to impinge any combination of the three areas of phosphor of said groups.

7. For use in a color television apparatus, a picture screen provided with a layer of phosphor material, said layer being divided into identical groups of color-emissive phosphor, each group being composed of three adjacent areas in side-by-side relation of different color phosphors whereby one of said areas is intermediate the other two areas, a mask having a plurality of apertures registered with respective ones of said groups of phosphor, an electron gun for producing two electron beams, means for scanning said beams over said mask for directing said beams onto said groups of phosphor, said gun comprising a first pair of spaced-apart parallel deflection plates, a second pair of spaced-apart parallel deflection plates, said first pair of plates being spaced apart in a direction parallel to an imaginary line passing through said other two areas of color phosphors, said second pair of plates being orthogonally related to said first pair of plates, a beam-splitting plate intermediate and substantially parallel to said first pair of plates, a tubular anode element surrounding and being insulated from said two pairs of plates, said beam-splitting plate being connected to said anode element, a second tubular anode element coaxially aligned with and positioned forwardly of the first-mentioned anode element to provide an electron-optical lens for said two beams; two beam-accelerating electrodes spaced apart and interposed between said mask and said electron gun, said electrodes adapted to have two different potentials applied thereto to serve as an electron lens, whereby said two beams are directed through said mask apertures to impinge selected areas of said phosphor groups; first circuit means coupling a first chrominance signal to said first pair of plates, second circuit means coupling a second chrominance signal to one of said second pair of plates, and third circuit means coupling a third chrominance signal to the other of said second pair of plates, whereby said two beams may be individually controlled to impinge any combination of the three areas of phosphor of said groups.

8. For use in a color television apparatus, an elongated evacuated envelope having a faceplate, a transparent electron-mirror electrode on the inner surface of said faceplate, a mask having a plurality of aligned apertures spaced from and parallel to said electrode, a layer of phosphor material on the surface of said mask facing said electrode, said layer being divided into repeating groups of red, green, and blue phosphor materials, each group comprising three adjacent and parallel strips of red, green and blue phosphor materials, said groups being aligned with the apertures in said mask, an electron gun in said envelope for producing two electron beams, means for scanning said beams over said mask for directing said beams in orderly sequence onto said groups; said gun comprising a first pair of spaced-apart parallel deflection plates, a second pair of spaced-apart parallel deflection plates, said first pair of plates being spaced apart in a direction perpendicular to said phosphor strips, said second pair of plates being orthogonally related to said first pair of plates, a beam-splitting plate intermediate and substantially parallel to said first pair of plates, a tubular anode element surrounding and being insulated from said two pairs of plates, said beam-splitting plate being connected to said anode element; and two electron lenses spaced apart and positioned between said electron gun and said mask, said electron lenses directing said beams through said mask apertures at an angle at which said beams are reflected backwardly through said apertures in the absence of a signal applied to said first and second pairs of plates.

9. For use in a color television apparatus, an elongated evacuated envelope having a faceplate, a transparent electron-mirror electrode on the inner surface of said faceplate, a mask having a plurality of aligned apertures spaced from and parallel to said electrode, a layer of phosphor material on the surface of said mask facing said electrode, said layer being divided into repeating groups of red, green, and blue phosphor materials, each group comprising three adjacent and parallel strips of red, green and blue phosphor materials, said groups being aligned with the apertures in said mask, an electron gun in said envelope for producing two electron beams, means for scanning said beams over said mask for directing said beams in orderly sequence onto said groups; said gun comprising a first pair of spaced-apart parallel deflection plates, a second pair of spaced-apart parallel deflection plates, said first pair of plates being spaced apart in a direction transverse of said phosphor strips, said second pair of plates being orthogonally related to said first pair of plates, a beam-splitting plate intermediate and substantially parallel to said first pair of plates, a tubular anode element surrounding and being insulated from said two pairs of plates, said beam-splitting plate being connected to said anode element; two electron lenses spaced apart and positioned between said electron gun and said mask, said electron lenses directing said beams through said mask apertures at an angle at which said beams are reflected backwardly through said apertures in the absence of a signal applied to said first and second pairs of plates; first circuit means coupling a first chrominance signal to said first pair of plates, second circuit means coupling a second chrominance signal to one of said second pair of plates, and third circuit means coupling a third chrominance signal to the other of said second pair of plates, whereby said two beams may be individually controlled to impinge any combination of the three strips of phosphor of said groups.

References Cited in the file of this patent

UNITED STATES PATENTS

| | | |
|---|---|---|
| 2,252,744 | Fleming-Williams | Aug. 19, 1941 |
| 2,336,895 | Shelton et al. | Dec. 14, 1943 |
| 2,577,038 | Rose | Dec. 4, 1951 |
| 2,611,099 | Jenny | Sept. 16, 1952 |
| 2,617,876 | Rose | Nov. 11, 1952 |
| 2,619,608 | Rajchman | Nov. 25, 1952 |
| 2,646,521 | Rajchman | July 21, 1953 |
| 2,741,720 | Lafferty | Apr. 10, 1956 |
| 2,757,301 | Jones et al. | July 31, 1956 |
| 2,803,781 | Jurgens | Aug. 20, 1957 |
| 2,813,224 | Francken | Nov. 12, 1957 |
| 2,831,918 | Dome | Apr. 22, 1958 |